Patented Feb. 19, 1935

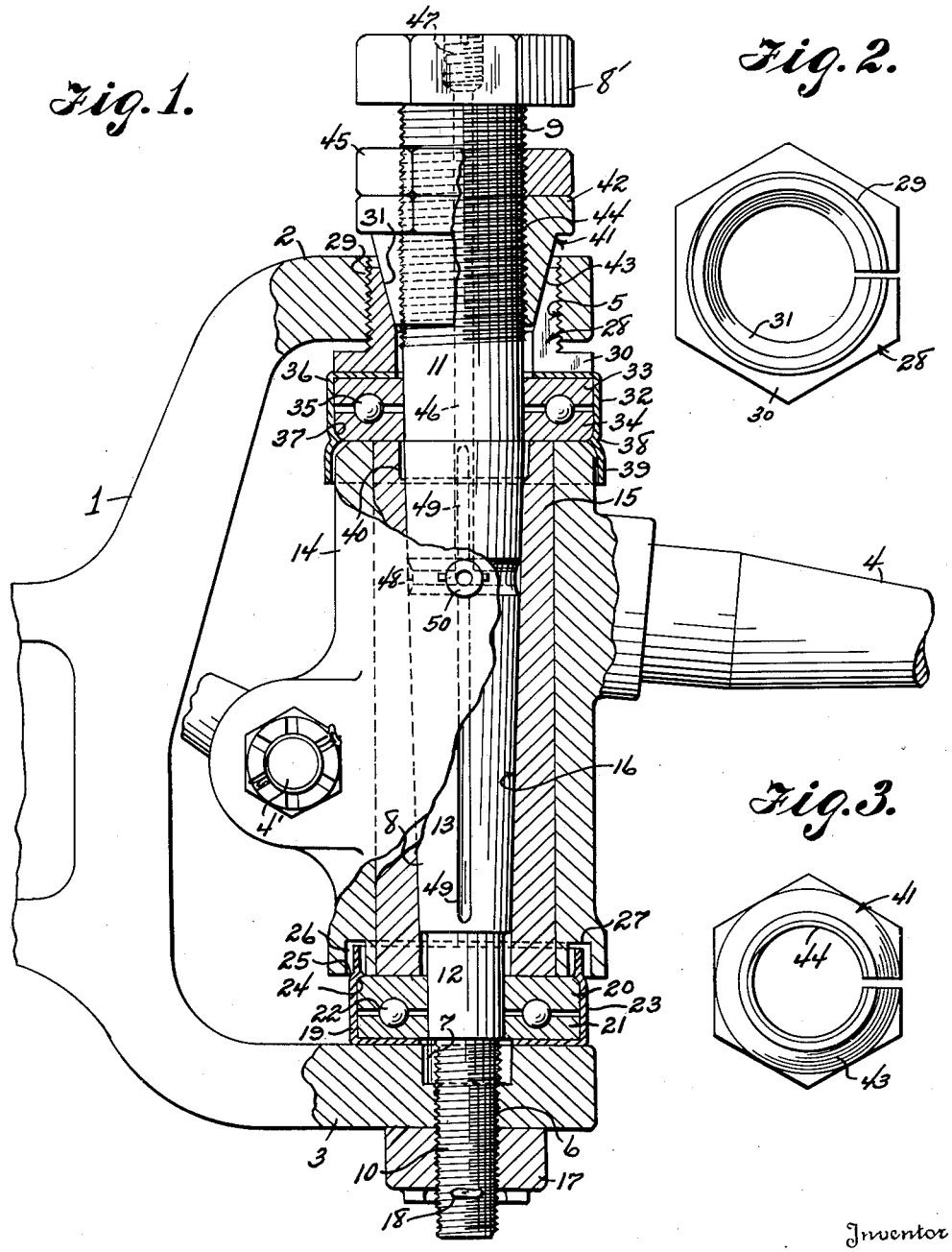

1,992,065

UNITED STATES PATENT OFFICE 1,992,065

KING PIN OR STEERING PIN BEARING

Lewis M. D. Grainger, Richmond, Va., assignor of one-fourth to Carl A. Kramer and one-fourth to Edward G. Bailey, both of Richmond, Va.

Application February 12, 1934, Serial No. 710,915

9 Claims. (Cl. 308—63)

This invention relates to improvements in king pin or steering pin bearings, and particularly to bearings of that type which are subject to rough usage and a high degree of wear with a tendency to looseness, and which are or may be exposed to all kinds of weather conditions and to the entrance between the bearing surfaces of water, grit or dirt or other foreign substances liable to cause rust and increased wear and tear whereby the efficiency and life period of usefulness of the bearing is decreased. More particularly the invention relates to improvements in pin bearings, such as the steering knuckles of automobiles, which are subjected to such conditions and which are liable to excessive wear and looseness causing shimmying and other improper actions of the steering gear and undue wear and tear upon the tires and running gear of the vehicle.

The object of the invention is to provide a novel and improved construction of king pin or steering pin bearing which overcomes these objections; which allows ready, easy and perfect adjustment of the pin to compensate for wear and to keep the bearing surfaces in proper contact to prevent looseness; which adapts the bearing surfaces to be most efficiently lubricated to secure easy motion and to prevent binding of the bearing parts; and which ensures the shielding and protection of the bearing surfaces against the entrance of moisture, dust and other foreign substances.

The invention consists of the features of construction, combination and arrangement of parts, hereinafter fully described and claimed, reference being had to the accompanying drawing, in which:—

Fig. 1 is a view partly in elevation and partly in section, showing the application of the invention to the king pin or steering pin of an automobile steering knuckle.

Fig. 2 is a top plan view of the split bushing ring.

Fig. 3 is a bottom plan view of the tapered adjusting nut.

In the embodiment of the invention as herein shown, 1 designates a support disclosed in the present instance as the front axle or supporting yoke of an automobile, having the bearing yoke or fork arms 2 and 3, and 4 is a steering spindle provided with the bearing eye, sleeve or steering knuckle coupled, as in practice, to the sleeve arm of the steering gear of the vehicle. The arm 2 is formed with a threaded opening 5 of uniform diameter, while the arm 3 is formed, in accordance with my invention, with an opening of much less diameter than the opening 5 and having a lower threaded portion 6 of uniform diameter and an upper smooth-surfaced or unthreaded portion or recess 7 of somewhat greater diameter than the portion 6.

The king pin or steering pin 8 is of novel construction, and is of a length to extend between the yoke arms and through the openings 5 and 6 in said yoke arms. The pin has an upper threaded circular portion 9 of uniform and major diameter, a lower threaded circular portion 10 of minimum diameter, an upper smooth-surfaced circular portion 11 of less diameter than the portion 9, a lower smooth-surfaced portion 12 disposed above and of somewhat greater diameter than the portion 10, and a main or body portion 13 extending between the portions 11 and 12 and tapering uniformly from its upper end, which intersects the portion 11, to its loose end, which intersects the portion 12. At the upper end of the pin is an angular head 8' for the application of a wrench thereto.

The portion 13 of the pin forms a stationary bearing about which rotates the spindle eye, sleeve or knuckle 14, within which is placed a bearing bushing 15 which is in direct engagement with the pin. The sleeve and bushing are coextensive in length with each other and the bushing is provided with a tapering bearing bore 16 snugly receiving and embracing the tapered surface of the pin. The said bore is of somewhat greater length than the length of the tapered surface 13 of the pin, preferably of such relative length that when, as in initial assemblage, the upper end of the portion 13 alines with the upper end of the bushing 15, the lower end of the portion 13 will be disposed a sufficient distance above the lower end of the bore 16 to provide a range of downward adjustment of the pin in the bushing to compensate for wear which will enable a close fit of the tapered bearing surface to be maintained during a predetermined long useful life period of the bearing.

The pin 8 has its threaded end 10 passing downwardly through the threaded opening 6 and engaged with the threads thereof, whereby said end of the pin is connected with the yoke arm 3, and to this end of the pin is applied a castellated check nut 17 which is preferably held from rotation and displacement by a cotter pin or key 18 passed through said part 10 of the pin. Disposed above the arm 3 and between the same and the lower end of the knuckle sleeve 14 is a lower end thrust bearing 19 comprising spaced disks 20 and 21 provided with a raceway for bearing balls or rollers 22, which disks are apertured to snugly receive the portion 12 of the pin and are enclosed in a protecting casing 23 which rests at its base or closed side against the upper surface of the arm 3 and closes entrance to the openings 6 and 7 so as to prevent the access of water, dirt and dust thereto. The upper corner edge of the disk 20 is beveled, at at 24, and the casing 23 is formed with an instruck retaining offset 25 engaging said beveled surface 23, and the casing is extended beyond this offset to provide a guard flange 26 which extends upwardly into a recess 27 in the lower end of the sleeve 14 to prevent entrance of water, dirt and dust to the space between the bearing 23 and lower ends of the sleeve 14 and bushing 15 and to the bearing surfaces of said parts and the pin 8.

The upper end of the pin extends through and is held in position relative to the yoke arm 2 by means of a split, expansible and contractible spring metal spacing ring or bushing 28, the body portion of which is provided with an outer threaded surface 29 to engage the threaded opening 5 in the arm 2 and is also provided at its base with a flange 30 and is provided in its upper portion with a conical or tapered surface 31. The flange 30 is of angular form or other suitable form to receive a spanner or other wrench and rests upon an upper end thrust bearing 32 which is similar in construction to the lower end thrust bearing 19 and comprises spaced bearing disks 33 and 34 having an intervening raceway for the reception of bearing balls or rollers 35. The disks 33 and 34 are enclosed in a casing 36 having a crown portion engaged by the flange 30 and resting on the disk 33 and serving to prevent access of water, dust and dirt to these parts of the bearing. The lower corner surface of the bottom disk 34 is provided with a beveled portion 37 engaged by a retaining offset 38 on the casing, and said casing is provided with a depending guard flange or apron 39 which encloses the upper part of the sleeve 14 and prevents water, dust and dirt from entering the bearing surfaces between the upper ends of the sleeve 14, bushing 15 and the end thrust bearing 32. The bearing disks 33 and 34 are apertured to snugly receive the portion 11 of the pin 8 and the upper end of the bushing 15 is formed with a recess 40 to receive said portion 11 of the pin whereby to permit downward adjustment of the pin in the bushing 15 to compensate for wear of the tapered bearing surfaces 13 and 16 of said bushing and pin.

It will be understood from the foregoing description that the pin is adjustably held in position at its lower end by engagement of its threaded portion 10 with the threaded opening 6, and that the knuckle sleeve 14 is centered and held in position between the arm 3 and the spacing ring or bushing 28 adjustably mounted in the arm 2 and contacts at its upper and lower ends with the thrust bearings 19 and 32, whereby an accurate centering of the sleeve 14 and its easy movements on and about the pin 8 are insured. Also it will be seen that the described construction of the thrust bearings provides additionally for the thorough and complete protection of the internal bearing surfaces against the entrance of moisture, dirt, dust, grit and other foreign particles causing rust and undue wear and interfering with the proper lubrication of the bearing surfaces. The upper end of the pin is centered with respect to the arm 2 and adjustably held in frictional binding engagement with said arm by means of a split spring metal binding nut 41 having an angular flange portion 42 for the application of a wrench thereto and having its body portion provided with an outer conical or tapered friction binding surface 43 and with a threaded bore or internal surface 44 to engage the threaded portion 9 of the pin 8. The conical friction binding surface 43 of this nut 41 is adapted for engagement with the tapered or conical friction binding surface 31 of the spacing ring or bushing 28, the members 28 and 41 cooperating to provide an adjusting means for the upper end of the pin in its wear take-up adjustment and as an adjusting means to regulate the pressure of the thrust bearings on the sleeve 14 and as a binding or clamping means to center the upper end of the pin 8 and to hold it in fixed relation to the yoke arm 2. A check nut 45 is provided for engagement with the threaded portion 9 of the pin and the upper end of the nut 41 to hold the latter from turning and becoming loose after adjustment.

The pin is provided with means whereby the bearing surfaces may be quickly, conveniently and efficiently lubricated. To this end the pin is formed with a lubricant feed passage 46 extending axially downward from a recess 47 at its upper end to a suitable point intermediate of the length of the pin and communicating at such point through one or more radial passages 47 with an annular distributing groove 48 formed in its tapered outer surface, whereby lubricant supplied under suitable force feed pressure through the passage 46 will be supplied to the bearing surfaces 13 and 16 to keep the same effectively lubricated. For the purpose of spreading the lubricant throughout the length of the bearing surfaces, longitudinal distributing grooves 49 may be provided in the sides of the pin and extending the greater portion of the length of its tapered surface, said grooves communicating with the annular groove 48 for the reception of the lubricant material therefrom. The recess 47 may be closed by a plug at all times when a lubricant is not being supplied to the passage 46, or a suitable check valve fitting may be mounted in the recess 47, which fitting may be adapted for the application of a force feed device thereto so that lubricant may be supplied to the bearings in a well known manner. A similar type of fitting 50 may also be fitted in one of the radial openings 47, so that lubricant may be directly supplied to the feed passage and grooves in the region of the groove 48. Either one or both of said fittings may be supplied and used in practice, as desired.

In the operation of assembling the parts of the bearing structure, the knuckle sleeve 14 with its bushing 15 applied is placed with the bearings 19 and 32 between the yoke arms 2 and 3, after the spacing ring or bushing 28 has been fitted in the opening 5, and the parts arranged so that the openings in the arms and the aforesaid bearing elements are in true axial alinement with each other. The binding nut 41 and check nut 45 having previously been placed in position on the threaded surface 9, the pin 8 is then applied by fitting it down through the openings in the ring 28, bearing 32, bushing 15, bearing 19 and opening 6, and its threaded lower end 10 is screwed down into engagement with the threads of the opening 6 until the pin is disposed so that its tapered surface 13 is disposed to properly fit in the tapered opening 16 of the bushing 15, after which the nut 17 is applied together with the locking pin 18 to fasten the lower end of the pin in adjusted position. The spacing ring 28, which in these operations is so disposed as to lie with its flange 30 out of engagement with the bearing 32, is then adjusted by means of a suitable wrench to bring its flange 30 into engagement with the bearing 32 to cause said bearing to engage the upper ends of the sleeve 14 and bushing 15 to hold said sleeve and bushing with a proper degree of pressure between the bearings 19 and 32. The nut 41 is then screwed downward on the surface 9 to force its tapered portion down into the tapered portion of the socket in the ring 28 until just the right amount of binding pressure is exerted to expand the ring 28 into tight engagement with the threaded opening 5 and to hold the nut 41 in tight frictional engagement with the ring 28, whereby such parts at the top of the bearing will be disposed to hold the upper end of the pin supported and properly centered and to institute a sufficient binding action to lock the parts 28 and 41 into adjusted position against any possibility of becoming casually loosened under ordinary conditions. The check nut 45, however, is provided to be screwed down into engagement with the nut 41 to lock the latter against casual retrograde rotation so as to prevent any possible loosening of the nut 41 due to its tapered engagement with the ring 28. When the parts are so assembled the sleeve 14 of the member 4 will be mounted for true rotation about the pin 8 as an axis and fitted to turn thereon with an exact degree of freedom desired. This freedom of motion may be regulated at any time by simply loosening the nut 41, adjusting the ring 28 to tighten or relax its pressure on the bearing 32, and then tightening up the nut 41 into binding pressure with ring 28 again.

When the parts are initially assembled, a relative positioning, as shown in Fig. 1, will occur, from which it will be seen that the pin 8 will be at its highest elevation in the tapered bore 16, in which position the part 12 of the pin, which normally extends partway up into the bore 16 and terminates at its lower end above the recess 7, will be arranged so as to allow a maximum degree of downward adjustment of the tapered part 13 of the pin in the bore 16 to compensate for wear. In adjusting the pin to compensate for wear, whenever the part 13 fits too loosely in the bore 16, the nuts 41 and 45 are relaxed and nut 17 relaxed or removed, and then the pin is screwed down in the opening 6 to the extent necessary to compensate for wear, after which the nuts are again set to hold the pin in such position. In addition to such adjustment of the pin in the bearing bushing 15, an adjustment of the ring 28 may also be effected for the purpose of securing a relative adjustment of the surfaces 13 and 16 and movement of the member 14 about the pin with the exact degree of freedom desired. By such construction and working adjustment of the parts it is, therefore, possible to secure fine adjustments to compensate for wear which is not possible with the adjusting means of similar bearings heretofore in use. Hence at all times in the life period of usefulness of the bearing proper adjustment may be made to cause the member 14 to turn throughout the correct arc, without undue vertical or tilting movements on the pin, so that the vehicle wheels will be supported for movement in true paths and shimmying and all other irregular motions due to looseness of parts effectually prevented.

From the foregoing description, taken in connection with the drawing, the construction and mode of use of my improved adjustable bearing for king pins or steering pins will be readily understood and it will be seen that the invention provides a bearing of this character which not only allows adjustments to compensate for wear to be made to adapt the bearing to be used and kept in efficient condition for a long useful life period, but which also effectually protect and safeguard the internal bearing surfaces from the access of moisture, dirt, dust, grit and other foreign substances causing additional wear and interfering with a proper distribution of the lubricant to such surfaces. Furthermore, the construction is such that over-pressure or underpressure of the bearing surfaces on one another may be prevented and the pressure regulated to insure even wear and to prevent the parts from binding or becoming frozen together. Other objects and advantages of the invention will be readily understood by those versed in the art without a further and extended description.

While the drawing shows the application of the invention to a steering knuckle for automobiles, for which use it is most efficiently adapted, it is to be understood that the invention may be applied to various other uses wherever a king pin is employed about which a cooperating bearing member rotates and where it is desirable to provide means for properly adjusting the bearing surface of the bearing pin and bearing member to compensate for wear and to secure an easy motion of the parts on one another, and also where it is desirable to prevent access of water and foreign substances to the bearing surfaces. Also while the construction disclosed herein is preferred, it is to be understood that changes in the form, construction, proportions and arrangement of parts may be made within the scope of the invention as set forth in the appended claims without departing from the spirit or sacrificing any of the advantages thereof.

What I claim is:—

1. In a bearing of the character described, the combination of a bearing yoke, a bearing sleeve disposed between the arms of the yoke and provided with a tapered bearing bore, a bearing pin extending through said sleeve and having a correspondingly tapered surface, said pin being adjustably engaged at one end with one of the arms of the yoke, and means comprising inter-engaging members for adjustably connecting the pin at its other end with the other arm of the yoke and adjusting the sleeve with relation to the pin and holding said pin and sleeve in adjusted relation to each other.

2. In a bearing of the character described, the combination of a bearing yoke, a longitudinally movable bearing sleeve disposed between the arms of the yoke and having a tapered bearing bore, means carried by one of the yoke arms for adjustably spacing the sleeve therefrom and adjusting said sleeve with relation to the other yoke arm, a bearing pin extending through the yoke arms and bearing sleeve and having a tapered portion to engage the bore of the latter, said pin being adjustably connected at one end with the latter-named yoke arm whereby it may be longitudinally adjusted in the sleeve bore to compensate for wear, and means adjustably engaging said end of the pin and holding it fixed with relation to the yoke arm which it engages.

3. In a bearing of the character described, the combination of a bearing yoke, a bearing sleeve disposed between the arms of the yoke and having a tapered bearing bore, a longitudinally movable, tapered bearing pin extending through the yoke arms and bore of the sleeve, said pin being adjustably engaged at one end with one of the yoke arms, a member adjustably engaging the other yoke arm and interposed between the same and the sleeve for holding the sleeve in a predetermined position with relation to the yoke and pin, and a member adjustably engaging the upper end of the pin and movable into adjustable binding engagement with the first-named member.

4. In a bearing of the character described, a bearing yoke, a bearing sleeve disposed between the arms of the yoke and having a tapered bearing bore, a bearing pin extending through said sleeve and the arms of the yoke and having a tapered bearing surface engaging said bore, said sleeve being adjustably engaged at one end with one of the yoke arms, an adjustable holding member on the other yoke arm, thrust bearings arranged respectively between one end of the sleeve and the first-named arm and between the other end of the sleeve and said adjustable holding member, and means adjustably engaging the pin and having an adjustable binding engagement with said holding member.

5. In a bearing of the character described, a bearing yoke, a bearing sleeve between the arms of the yoke having a tapered bearing bore, a bearing pin extending through said bore and the arms of the yoke and having a tapered bearing surface engaging the bore, an adjustable holding connection between one end of the pin and one of the yoke arms, an adjustable spacing member engaging the other yoke arm and disposed between the same and the sleeve, and an adjustable holding member on the other end of the pin and movable into engagement with the spacing member, said spacing and holding member having wedge surfaces for binding engagement with each other.

6. In a bearing of the character described, a bearing yoke, a bearing sleeve between the arms of the yoke having a tapered bearing bore, a bearing pin extending through said bore and the arms of the yoke and having a tapered bearing surface engaging the bore, an adjustable holding connection between one end of the pin and one of the yoke arms, a split resilient spacing and binding ring adjustably engaging the other yoke arm and disposed between the same and the sleeve, and a split resilient nut on the other end of the pin engaging said ring, the ring and nut having frictional wedging surfaces for engagement with each other.

7. In a bearing of the character described, a bearing yoke, a bearing sleeve disposed between the yoke arms and having a tapered bearing bore, a bearing pin extending through the yoke arm and bore of the sleeve and having a correspondingly tapered portion, means adjustably connecting one end of the pin with one of the yoke arms, thrust bearings at opposite ends of the sleeve, and adjustable spacing and holding means between one of the thrust bearings and opposite end of the pin comprising a threaded spacing ring engaging the other yoke arm and having a friction binding surface, and an adjustable retaining member on the pin having a friction binding surface for cooperation therewith.

8. In a bearing of the character described, a bearing yoke, a bearing sleeve disposed between the yoke arms and having a tapered bearing bore, a bearing pin extending through the yoke arm and bore of the sleeve and having a correspondingly tapered portion, means adjustably connecting one end of the pin with one of the yoke arms, thrust bearings at opposite ends of the sleeve, and adjustable spacing and holding means between one of the thrust bearings and opposite end of the pin comprising a split resilient spacing member in threaded engagement with the other yoke arm and bearing on the adjacent thrust bearing, said spacing member having a conical friction surface, and a split resilient nut adjustably engaging the pin and provided with a conical friction surface engaging the conical friction surface of said spacing member.

9. In a bearing of the character described, a bearing yoke, a bearing sleeve disposed between the arms of the yoke, said sleeve having a tapered bearing bore, a bearing pin extending through the yoke arms and sleeve and having a correspondingly tapered portion to engage said bore, said pin having an adjustable engagement at one end with one of the yoke arms, adjusting means between the other end of the pin and the other yoke arm including an adjusting member adjustably engaging said yoke arm, and thrust bearings at each end of the sleeve, one disposed between the first-named yoke arm and adjacent end of the sleeve and the other disposed between the other end of the sleeve and the said adjusting member, each of said bearings having a casing provided with a projecting portion lapping the adjacent end of the sleeve to close the joint between the casing and such end of the sleeve.

LEWIS M. D. GRAINGER.